A. R. PRITCHARD.
OIL POT INDICATOR.
APPLICATION FILED JAN. 10, 1910.

979,799.

Patented Dec 27, 1910.

Witnesses
Farnum F. Dorsey
Clarence W. Carroll

Inventor
Albert R. Pritchard

By L. Schuyler Davis
Attorney

UNITED STATES PATENT OFFICE.

ALBERT R. PRITCHARD, OF ROCHESTER, NEW YORK.

OIL-POT INDICATOR.

979,799.

Specification of Letters Patent.  Patented Dec. 27, 1910.

Application filed January 10, 1910. Serial No. 537,310.

*To all whom it may concern:*

Be it known that I, ALBERT R. PRITCHARD, a citizen of the United States, and resident of Rochester, in the county of Monroe and State of New York, have invented certain new and useful Improvements in Oil-Pot Indicators, of which the following is a specification.

This invention relates to oil pot indicators. Its object is to provide for lanterns, lamps, etc., where oil in one form or another is burned, means of novel and simple construction whereby the quantity of oil in the oil pot can be determined by inspection.

Figure 1:
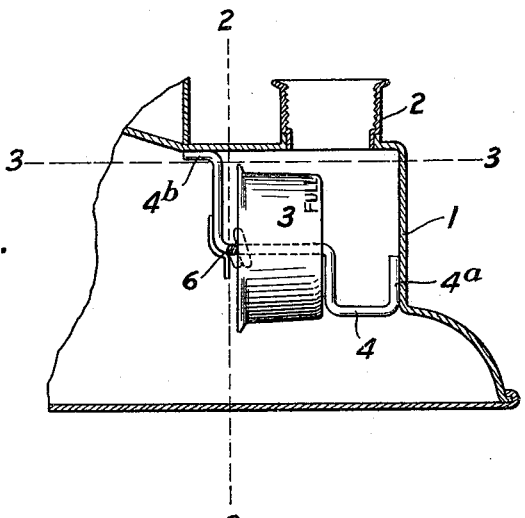
Figure 2:
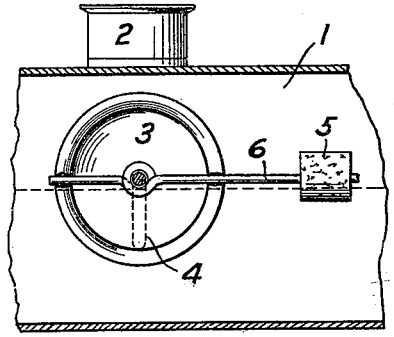
Figure 3:
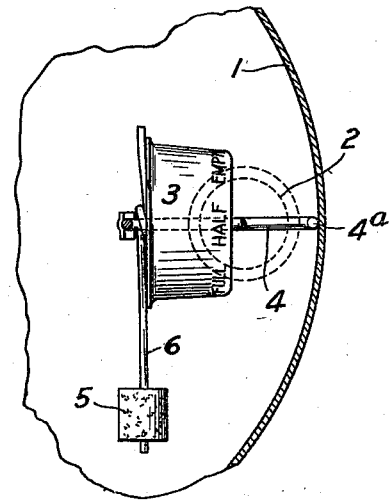

In the drawings:—Figure 1 is a central vertical section of a portion of the oil pot of a lantern, and shows in side elevation the indicator in place; Fig. 2 is a section on the line 2—2 in Fig. 1, looking from right to left; and Fig. 3 is a sectional plan view on the line 3—3 of Fig. 1.

In the drawings a portion only is shown of the oil pot 1 of a lantern or lamp to which an indicator embodying the present invention is applied, this oil pot having a filling collar of the usual form. The filling collar 2 is adapted to be closed by a screw threaded plug of the usual form, which is not shown.

The indicator is placed within the pot below the filling collar, and is so placed that it does not interfere with filling the oil pot, and yet is plainly visible when the cap is removed from the collar. The indicator bears certain markings which refer to the quantity of oil within the pot, and which the indicator is adapted to bring, one at a time, into the field of view through the collar 2, according to the condition of the oil pot in this respect.

In the drawings, a revoluble indicator is shown, and the form shown is that of a cylinder. A cheap and simple way to make this cylinder 3 is to spin it into a cup-like shape, as shown in the drawings, and when in that form, a very simple bracket for supporting it rotatably beneath the collar 2 is made by bending a piece of wire 4 at right angles on each side of the cylinder (preferably in opposite directions), and then again at its ends 4ᵃ and 4ᵇ, so that one end 4ᵃ may be soldered to the side of the pot and the other end may be soldered to the top of the pot. In this way the cylinder is held by the wire itself against longitudinal movement upon it. A float 5 is employed to rotate the indicator. This is attached to the cylinder so that it projects from it at one side. A convenient form of attachment is a wire that makes a turn around the bracket 4 and is soldered to the cylinder on each side of its axis. The float 5 is attached to the projecting arm of the wire 6 (Figs. 2 and 3), and is of cork or other suitable substance.

The words "full," "half," "empty," or other suitable terms or markings, are preferably placed so that one only is visible at a time through the collar 2, and the length of the float-carrying arm is suitable to bring these into view when and as the conditions prevail in the oil pot that they indicate.

What I claim is:—

1. The combination, with an oil pot having a filling opening, of a cylindrical indicator having a series of symbols to indicate the contents of the pot, a float to actuate the indicator, an arm connecting the indicator and the float, and a bracket for supporting the indicator rotatably beneath the filling opening, the bracket consisting of a wire bent upwardly on one side of the indicator and downwardly on the other side thereof to form stops to limit the lengthwise movement of the indicator on the bracket, the ends of the wire being secured, respectively, to the top and the side of the oil pot.

2. The combination, with an oil pot having a filling opening, of a cup-shaped indicator having a series of symbols to indicate the contents of the pot, a wire fixed to and crossing the open end of the indicator and having a loop therein to form a pivotal bearing for the indicator, a float secured to one end of said wire, and a bracket for supporting the indicator rotatably beneath the filling opening, the bracket comprising a wire bent at an angle on each side of the indicator to form stops to limit the lengthwise movement of the indicator on the bracket, the bracket passing through the loop in the first-mentioned wire and being secured at its ends to the oil pot.

ALBERT R. PRITCHARD.

Witnesses:
  FARNUM F. DORSEY,
  D. GURNEE.